B. MONNICH.
COMBINED FRONT AXLE SUPPORT AND SHOCK ABSORBER FOR MOTOR CARS.
APPLICATION FILED OCT. 15, 1914.

1,147,744.
Patented July 27, 1915.

Inventor
Bernard Monnich
By

Witnesses
Einar Larson
Margery C Lucas

Attorneys

UNITED STATES PATENT OFFICE.

BERNARD MONNICH, OF HOOPER, NEBRASKA.

COMBINED FRONT-AXLE SUPPORT AND SHOCK-ABSORBER FOR MOTOR-CARS.

1,147,744.      Specification of Letters Patent.      Patented July 27, 1915.

Application filed October 15, 1914. Serial No. 866,812.

*To all whom it may concern:*

Be it known that I, BERNARD MONNICH, a citizen of the United States, residing at Hooper, in the county of Dodge and State of Nebraska, have invented certain new and useful Improvements in Combined Front-Axle Supports and Shock-Absorbers for Motor-Cars, of which the following is a specification.

This invention relates to motor cars and its object is to provide a novel and improved front axle supporting means which also serves as a shock absorber.

The invention consists in a combination and arrangement of parts to be hereinafter described and claimed, reference being had to the accompanying drawing, in which—

Figure 1:
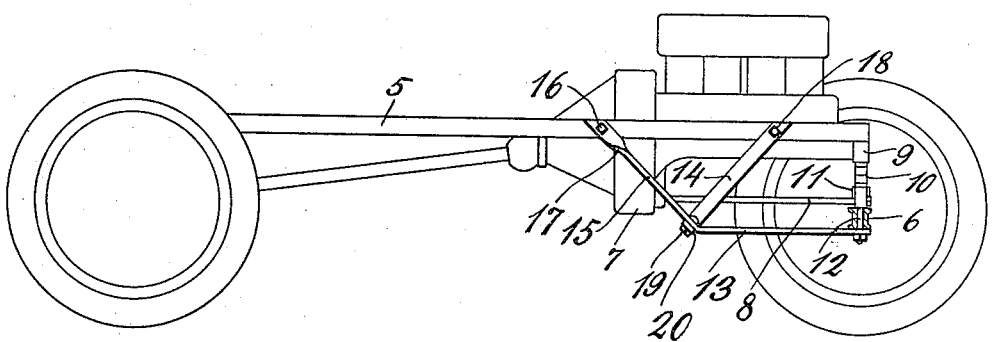
Figure 2:
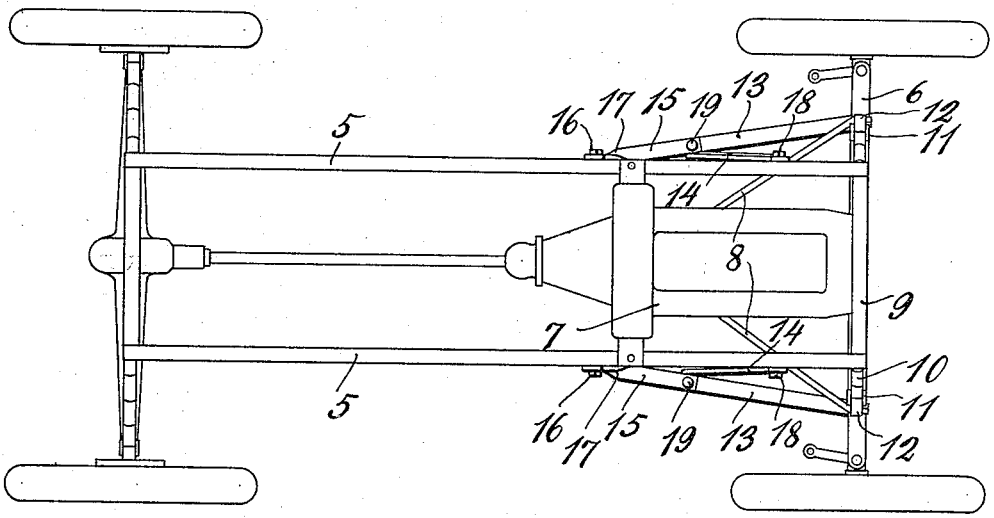

Figure 1 is a side elevation of the running gear of the car showing the application of the invention, and Fig. 2 is a plan view thereof.

Referring specifically to the drawing, 5 denotes the side bars of the chassis, and 6 denotes the front axle. The side bars support a crank case 7, between which latter and the front axle extend radius rods 8. The front ends of the side bars have a connecting portion 9 supported on a transverse spring 10 connected at its ends to the front axle by means of shackles 11. The shackle bolts are indicated at 12. These parts are constructed and arranged in the usual manner as in the well known Ford car to which the invention is specially applicable, although not limited thereto.

The combined front axle support and shock absorber, which is the subject matter of the present application for patent, comprises spring steel bars 13 connected at their forward ends to the front axle 6, beneath the latter, by means of the shackle bolts 12, and at their rear ends to the side bars 5, there being one of these bars on each side of the frame, and to each one of said bars, intermediate the ends thereof, is connected a spring steel bar 14 made fast to the side bar. The bar 13 extends rearward from the axle, and intermediate its ends it is bent upward, as indicated at 15, so that it may be fastened at its rear end to the side bar, as indicated at 16. The rear end of the bar 13 has a sidewise twist 17 so that it may be placed flat against the side bar and bolted or otherwise made fast thereto. The bar 14 is bolted or otherwise fastened to the side bar, as indicated at 18, and it extends downwardly therefrom at an oblique angle to meet the bar 13 at the commencement of the bend 15, at which point it is bolted or otherwise made fast to said bar, as indicated at 19, the lower end of said bar 14 having a lateral bend 20 which comes beneath the bar 13, the fastening 19 passing therethrough.

The structure hereinbefore described provides a support and brace for the front axle from the under side, and also serves as a shock absorber. The movement of the car body up and down, incident to road shocks, flexes the bar 13 from the point of attachment of the bar 14 to the front axle, and thus said bar 13 acts to absorb shocks, as it has a tendency to check both the upward and downward movement of the car body. The structure also takes the strain of the radius rods 8 from the crank case 7, and relieves the latter from all road shocks, and thus prevents jarring loose of the rivets in the crank case hangers, and reduces the danger of bending or breakage of the radius rods to a minimum. When the attachment is in place on the car, the point 20 will be about two inches above the point of attachment of the bar 13 with the front axle. Hence, when the axle moves toward the body, the axle must necessarily move forward, relieving the strain from the crank case until the axle moves past the center, or on the horizontal with the point 20. However, this does not occur as the front spring does not allow the axle to move more than one and one-half inches toward the body except in extreme cases, when it can move not more than three inches, which would bring the axle in contact with the spring clips. When at the extreme it is impossible for the radius rod to transmit road shocks to the crank case. The parts can be easily applied to the car without any change in the structure thereof, and as they are few and simple, the installation can be readily and cheaply made.

I claim:

1. The combination with the frame and front axle of a vehicle, said frame being spring supported by the axle; of resilient bars made fast to said axle and extending rearward therefrom and made fast at their rear ends to the frame, said bars being free to flex up and down, and bars made fast to the frame, and extending to and connected with the first-mentioned bars intermediate the ends thereof.

2. The combination with the frame and front axle of a vehicle, said frame being spring supported by the axle; of resilient bars made fast to said axle and having an upward bend intermediate their ends extending rearward to and fastened to the frame, and bars extending between the frame and the angle of the bend in the first-mentioned bars and made fast to the frame, and to said first-mentioned bars at the angle, said first-mentioned bars being free to flex up and down between the points of attachment to the axle and the points of attachment of the second-mentioned bars.

In testimony whereof I affix my signature in presence of two witnesses.

BERNARD MONNICH.

Witnesses:
LLOYD STEINBAUGH,
H. G. MEYER.

Copies of this patent may be obtained for five cents each, by addressing the "Commissioner of Patents, Washington, D. C."